(12) United States Patent
Okamoto et al.

(10) Patent No.: US 11,939,416 B2
(45) Date of Patent: Mar. 26, 2024

(54) COMPOSITION FOR OPTICAL STEREOLITHOGRAPHY, STEREOLITHOGRAPHIC OBJECT, AND METHOD FOR PRODUCING THE SAME

(71) Applicant: OKAMOTO CHEMICAL INDUSTRY CO., LTD., Warabi (JP)

(72) Inventors: Hiroaki Okamoto, Warabi (JP); Masaro Nakatsuka, Warabi (JP)

(73) Assignee: Okamoto Chemical Industry Co., Ltd., Warabi (JP)

( * ) Notice: Subject to any disclaimer, the term of this patent is extended or adjusted under 35 U.S.C. 154(b) by 771 days.

(21) Appl. No.: 16/963,018

(22) PCT Filed: Mar. 29, 2018

(86) PCT No.: PCT/JP2018/013222
§ 371 (c)(1),
(2) Date: Jul. 17, 2020

(87) PCT Pub. No.: WO2019/146132
PCT Pub. Date: Aug. 1, 2019

(65) Prior Publication Data
US 2020/0339722 A1  Oct. 29, 2020

(30) Foreign Application Priority Data
Jan. 26, 2018 (JP) .................. 2018-011658

(51) Int. Cl.
*C08F 290/06* (2006.01)
*C08J 5/18* (2006.01)

(52) U.S. Cl.
CPC .............. *C08F 290/06* (2013.01); *C08J 5/18* (2013.01); *C08J 2351/08* (2013.01)

(58) Field of Classification Search
CPC ........ C08F 290/06; C08F 290/04; C08F 2/44; C08F 2/50; C08F 263/08; C08J 5/18; C08J 2351/08; B33Y 70/00
See application file for complete search history.

(56) References Cited

U.S. PATENT DOCUMENTS

| | | | |
|---|---|---|---|
| 2017/0152391 A1* | 6/2017 | Miyamoto | ........... C09D 11/101 |
| 2018/0072841 A1 | 3/2018 | Okamoto et al. | |
| 2019/0009457 A1 | 1/2019 | Watanabe | |

FOREIGN PATENT DOCUMENTS

| | | |
|---|---|---|
| JP | 1122804 | 8/1999 |
| JP | 2003226724 | 8/2003 |
| JP | 2008189783 | 8/2008 |
| JP | 2008260812 | 10/2008 |
| JP | 2010260917 | 11/2010 |
| JP | 2011074253 | 4/2011 |
| JP | 2013023574 | 2/2013 |
| JP | 2015174919 | 10/2015 |
| JP | 2017095602 A | 6/2017 |
| JP | 2017165964 A | 9/2017 |
| WO | 2015/137504 | 9/2015 |
| WO | 2016163283 A1 | 10/2016 |
| WO | 2017/033427 | 3/2017 |

OTHER PUBLICATIONS

"Extended European Search Report corresponding to European Application No. 18902854.1 dated Sep. 17, 2021".
"Office Action corresponding to Japanese Application No. 2019-567829 dated Aug. 19, 2022".
International Search Report corresponding to International Application No. PCT/JP2018/013222 dated Jun. 26, 2018.

* cited by examiner

*Primary Examiner* — Jessica M Roswell
(74) *Attorney, Agent, or Firm* — Myers Bigel, P.A.

(57) ABSTRACT

Provided is a composition for optical stereolithography the stereolithography (photocuring) of which is completed in a shorter time and which provides a stereolithographic object having excellent strength (strength that prevents the occurrence of a fracture and the like when the stereolithographic object is subjected to an impact, or dropping, and strength with which the stereolithographic object can withstand repeated folding). The composition for optical stereolithography of the present invention includes (A) a diallyl phthalate-based polymer; (B) radical polymerizable compounds having a methacrylic group and/or an acrylic group; (C) a radical polymerization initiator; and (D) a sensitizer. The (B) radical polymerizable compounds includes at least (B1) an epoxy (meth)acrylate having a methacrylic group and/or an acrylic group, or (B2) a dioxane (meth)acrylate having a methacrylic group and/or an acrylic group. The composition contains 0.5 to 10% by mass of (A), 5 to 43% by mass of (B1) and (B2), 20 to 95% by mass of (B) other than (B1) and (B2), 0.1 to 5% by mass of (C), and 0.1 to 5% by mass of (D).

21 Claims, No Drawings

COMPOSITION FOR OPTICAL STEREOLITHOGRAPHY, STEREOLITHOGRAPHIC OBJECT, AND METHOD FOR PRODUCING THE SAME

RELATED APPLICATIONS

This application is a 35 U.S.C. § 371 national phase application of PCT Application PCT/JP2018/013222 filed Mar. 29, 2018, which claims priority to Japanese Application No. 2018-011658 filed Jan. 26, 2018. The entire contents of each are incorporated herein by reference in its entirety.

FIELD OF THE INVENTION

The present invention relates to a composition for optical stereolithography, to a stereolithographic object, and to a method for producing the same.

BACKGROUND OF THE INVENTION

Recently, optical stereolithographic techniques have attracted attention for the fabrication of a stereolithographic object based on three-dimensional CAD data by stacking cured layers one by one which are formed by curing a photocurable resin using ultraviolet laser scanning. According to the optical stereolithographic technique ("optical stereolithography" is also hereinafter referred to as "stereolithography"), a prototype can be fabricated simply and quickly without having to provide a die or a mold, and therefore, the time and cost required from design in product development to production can be reduced. Along with the rapid spread of three-dimensional CAD, the stereolithographic technique has been adopted in a wide range of industrial fields such as automobile parts, electrical equipment, and medical equipment.

Due to the expansion of the fields in which optical stereolithographic techniques are being applied, performance required of photocurable resins has also increased. In particular, photocurable resins are required that have a fast curing rate, are excellent in dimensional stability and dimensional accuracy when cured, and can form stereolithographic objects with excellent mechanical characteristics such as toughness and durability and heat resistance that are less likely to break even if external stress such as bending is applied. For example, it is described that a photocurable resin that does not cause warping of a substrate film or a crack in a coating film when irradiated with an active energy ray to make the coating film was obtained by containing a (meth)acrylate of a polyglycerin alkylene oxide adduct (number of moles added: 50 to 200) as a raw material of the photocurable resin (Patent Document 1).

In addition, with the progress of the stereolithographic technique, photocurable resins that can be used in applications in which higher heat resistance is needed, for example, stereolithographic objects used for engine portions, are required. For example, compositions in which a particular cationically polymerizable organic substance or a particular compound having two oxetanyl groups is blended are proposed (Patent Document 2, Patent Document 3, and Patent Document 4).

REFERENCE DOCUMENT LIST

Patent Documents

Patent Document 1: JP 2010-260917 A
Patent Document 2: JP H11-228804 A
Patent Document 3: JP 2008-260812 A
Patent Document 4: JP 2013-023574 A

SUMMARY OF THE INVENTION

Problem to Be Solved By the Invention

Commercial stereolithographic objects produced by stereolithography often have a complicated shape and must adapt to applications in which force is applied, they are bent, and heat is applied. However, generally, in the production of a stereolithographic object, the stereolithographic object is produced by stacking thin cured film layers about 20 to 100 microns thick formed by scanning an stereolithographic composition with an ultraviolet laser, and at this time, the strength of the stereolithographic object may be influenced unless the thin cured film layers adhere closely to each other. Furthermore, a problem of conventional stereolithographic compositions is that a stereolithographic object may warp and be caught by an ultraviolet laser scanner during production.

In addition, as described in Patent Document 2, in order to improve the heat resistance of a stereolithographic object, after a composition is cured by light irradiation, further ultraviolet irradiation treatment and heat treatment are generally performed, but even if such ultraviolet irradiation treatment is performed, satisfactory strength (for example, strength that prevents the occurrence of a fracture and the like when the stereolithographic object is subjected to an impact, or is dropped) has not yet been provided.

Furthermore, as described in Patent Document 2, in order to improve the heat resistance of a stereolithographic object, after a composition is cured by light irradiation, further heating, for example, at 60 to 250° C. is generally performed, but when heat treatment is performed in this manner, the number of steps increases, and therefore, the work efficiency may decrease.

Accordingly, in view of the above problems, it is an object of the present invention to provide a composition for optical stereolithography comprising a water-insoluble radical polymerizable component, the stereolithography (photocuring) of which is completed in a shorter time and which provides a stereolithographic object having excellent strength (strength that prevents the occurrence of a fracture and the like when the stereolithographic object is subjected to an impact, or is dropped, and strength with which the stereolithographic object can withstand repeated folding) by being subjected to ultraviolet irradiation treatment after stereolithography, a stereolithographic object thereof, and a method for producing a stereolithographic object.

Means for Solving the Problem

In order to achieve the above object, one aspect of the present invention is a composition for optical stereolithography which includes: (A) a diallyl phthalate-based polymer; (B) radical polymerizable compounds having a methacrylic group and/or an acrylic group; (C) a radical polymerization initiator; and (D) a sensitizer,
the (B) radical polymerizable compounds having a methacrylic group and/or an acrylic group containing at least (B1) a radical polymerizable compound of an epoxy (meth)acrylate having a methacrylic group and/or an acrylic group, and/or (B2) a radical polymerizable compound of a dioxane (meth)acrylate having a methacrylic group and/or an acrylic group, and the composition for optical stereolithography including: 0.5 to 10% by mass of the (A) diallyl phthalate-based polymer, 5 to 43% by mass of a total content of the (B1) and (B2) radical polymerizable compounds, 20 to 95% by mass of a radical polymerizable compound of the (B) radical polymerizable compounds other than the (B1) and (B2) radical polymerizable compounds, 0.1 to 5% by mass of the (C) radical polymerization initiator, and 0.1 to 5% by mass of the (D) sensitizer.

The composition for optical stereolithography according to the present invention may further comprise 0.125 to 2.5% by mass of (E) a compound having an allyl group that is not a diallyl phthalate-based polymer.

In the composition for optical stereolithography according to the present invention, the (A) diallyl phthalate-based polymer may be a diallyl orthophthalate polymer or a diallyl isophthalate polymer.

The composition for optical stereolithography according to the present invention may further comprise 5 to 40% by mass of (F) a polyoxyethylene polyglyceryl ether-acrylic acid adduct having a structure of the following general formula (1):

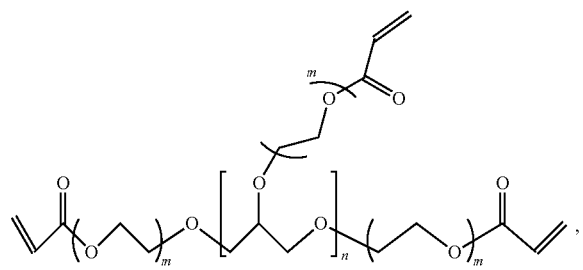

wherein n represents an integer of 2 to 20, and m represents an integer of 50 to 200.

Another aspect of the present invention is a method for producing a stereolithographic object, including at least a step of irradiating the above-described composition for optical stereolithography with an active energy ray to cure the composition for optical stereolithography.

Yet another aspect of the present invention is a stereolithographic object including a cured product of the above-described composition for optical stereolithography.

Effects of the Invention

According to the present invention, it is possible to provide a composition for optical stereolithography that can shorten photocuring time in producing a stereolithographic object and can produce a stereolithographic object having excellent strength (strength that prevents the occurrence of a fracture and the like when the stereolithographic object is subjected to an impact, or dropping, and strength with flexibility with which the stereolithographic object can withstand repeated folding) by being subjected to ultraviolet irradiation treatment after photocuring. In addition, when this composition for optical stereolithography is used, cured layer films adhere closely to each other in the production process of a stereolithographic object, and therefore, warp deformation decreases, and furthermore, the adhesion between the layers is good, and therefore, a stereolithographic object having high strength (for example, bending strength, bending modulus, and repeated bending strength) can be obtained.

MODE FOR CARRYING OUT THE INVENTION

One embodiment of each of a composition for optical stereolithography, a stereolithographic object thereof, and a method for producing a stereolithographic object according to the present invention will be described below, but the scope of the present invention is not limited to this mode.

The composition for optical stereolithography of the embodiment contains at least components (A) to (D), the details of which will be described below, preferably further contains components (E) and/or (F), and further contains other components as needed.

The component (A) is a diallyl phthalate-based polymer (also referred to as a diallyl phthalate resin). Specific examples of the diallyl phthalate-based polymer, the component (A), include a diallyl orthophthalate polymer and a diallyl isophthalate polymer. By adding the component (A) to the optically stereolithographic object composition, sufficient mechanical strength and flexibility can be obtained when a stereolithographic object is formed, and in addition excellent strength (for example, strength that prevents the occurrence of a fracture and the like when the stereolithographic object is subjected to an impact, or is dropped) is obtained.

The diallyl phthalate-based polymer, the component (A), may be synthesized by a known method, and in addition a commercial one may be used. Examples thereof include DAISO DAP A, DAISO DAP K, DAISO DAP S, and DAISO ISO DAP manufactured by OSAKA SODA CO., LTD.

The content of the diallyl phthalate-based polymer, the component (A), is in the range of 0.5 to 10% by mass, preferably 1 to 8% by mass, in the total amount of the composition for optical stereolithography. When the content of the component (A) is less than 0.5% by mass, the influence of the diallyl phthalate-based polymer does not appear in the composition for optical stereolithography, and the composition is hard and brittle. When the content is more than 10% by mass, the composition for optical stereolithography can cure only in the portion of the surface, and the composition is soft and brittle as a whole.

The component (B) is a radical polymerizable compound having a methacrylic group and/or an acrylic group. As this radical polymerizable compound having a methacrylic group and/or an acrylic group, the component (B), at least an epoxy (meth)acrylate having a methacrylic group and/or an acrylic group, a component (B1), or a dioxane (meth)acrylate having a methacrylic group and/or an acrylic group, a component (B2), is contained. By adding the radical polymerizable compound, the component (B1) or the component (B2), to the composition for optical stereolithography, mechanical strength and flexibility can be provided, and a cured product that is less likely to break is obtained.

Specific examples of the epoxy (meth)acrylate having a methacrylic group and/or an acrylic group, the component (B1), include a bisphenol A diglycidyl ether (meth)acrylic acid adduct, a bisphenol A diglycidyl ether (meth)acrylic acid adduct, an ethylene glycol diglycidyl ether (meth)acrylic acid adduct, a propylene glycol diglycidyl ether (meth)acrylic acid adduct, a glycerin diglycidyl ether (meth)acrylic acid adduct, a bisphenol A (PO 2 mol) adduct diglycidyl ether (meth)acrylic acid adduct, an epoxidized soybean oil (meth)acrylic acid adduct, and a novolac-based epoxy resin (meth)acrylic acid adduct.

The epoxy (meth)acrylate having a methacrylic group and/or an acrylic group, the component (B1), may be synthesized by a known method, and in addition a commercial one may be used. Examples thereof include EPDXY ESTER series 40EM, 70PA, 200PA, 80MFA, 3002M(N), 3002A(N), 3000MK, and 3000A manufactured by Kyoeisha Chemical Co., Ltd., EBECRYL series 600, 605, 645, 648, 860, 3500, 3603, 3608, 3700, 3701, 3702, 3703, and 3708 manufactured by DAICEL-ALLNEX LTD., KAYARAD series R-115F, R-130, R-381, EAM-2160, and ZFA-266H manufactured by Nippon Kayaku Co., Ltd., Viscoat series #540 manufactured by OSAKA ORGANIC CHEMICAL INDUSTRY LTD., and CN series 104, 111, 115, 116, 118, 120, and 120A60 manufactured by Sartomer, USA.

The content of the epoxy (meth)acrylate having a methacrylic group and/or an acrylic group, the component (B1), is in the range of 5 to 43% by mass, preferably in the range of 10 to 30% by mass, in the total amount of the composition for optical stereolithography. When the content of the component (B1) is less than 5% by mass, the toughness is insufficient when a stereolithographic object is formed. When the content is more than 43% by mass, the sensitivity to an active energy ray used for irradiation in order to obtain a stereolithographic object decreases, and the desired stereolithographic object is not obtained.

Specific examples of the dioxane (meth)acrylate having a methacrylic group and/or an acrylic group, the component (B2), include dioxane glycol di(meth)acrylate and (2-oxo-1,3-dioxolan-4-yl)methyl methacrylate.

The dioxane (meth)acrylate having a methacrylic group and/or an acrylic group, the component (B2), may be synthesized by a known method, and in addition a commercial one may be used. Examples thereof include KAYARAD R-604 manufactured by Nippon Kayaku Co., Ltd. and NK Ester A-DOG manufactured by Shin Nakamura Chemical Co., Ltd.

The content of the dioxane (meth)acrylate having a methacrylic group and/or an acrylic group, the component (B2), is in the range of 5 to 43% by mass, preferably in the range of 10 to 30% by mass, in the total amount of the composition for optical stereolithography. When the content of the component (B2) is less than 5% by mass, curing is slow, and a stereolithographic object is brittle when formed. When the content is more than 43% by mass, curing is too fast, and the close adhesion of thin cured film layers to each other worsens, and the strength of the stereolithographic object decreases. The component (B1) and the component (2) may be simultaneously contained, and the content in this case is in the range of 5 to 43% by mass, preferably in the range of 10 to 30% by mass, in the total amount of the composition for optical stereolithography, in terms of the total of the component (B1) and the component (B2).

As the radical polymerizable compound having a methacrylic group and/or an acrylic group, the component (B), another radical polymerizable compound other than the above-described component (B1) and component (B2) may be further contained (hereinafter referred to as "another radical polymerizable compound of the component (B)"). The content of this another radical polymerizable compound of the component (B) is not particularly limited as long as the performance of the composition for optical stereolithography is not impaired. For example, the content is preferably 20 to 95% by mass, more preferably 20 to 85% by mass, in the total amount of the composition for optical stereolithography.

Specific examples of a monofunctional monomer of another radical polymerizable compound of the component (B) may include (meth)acryloylmorpholine, 2-hydroxyethyl (meth)acrylate, 2-hydroxylpropyl (meth)acrylate, polyethylene glycol mono(meth)acrylate, glycerin (meth)acrylate, nonylphenol EO-modified (meth)acrylate, the reaction product of 2-hydroxylethyl (meth)acrylate and phosphoric anhydride, the reaction product of a hexalide addition polymer of 2-hydroxylethyl (meth)acrylate and phosphoric anhydride, acrylamide, 7-amino-3, 7-dimethyloctyl (meth)acrylate, isobutoxymethyl(meth)acrylamide, isobornyl (meth)acrylate, 2-ethylhexyl (meth)acrylate, diacetone (meth)acrylamide, dimethylaminoethyl (meth)acrylate, diethylaminoethyl (meth)acrylate, lauryl (meth)acrylate, dicyclopentenyloxyethyl (meth)acrylate, dicyclopentenyl (meth)acrylate, N,N-dimethyl(meth)acrylamide, tetrahydrofurfuryl (meth)acrylate, vinylcaprolactam, N-vinylpyrrolidone, phenoxyethyl (meth)acrylate, butoxyethyl (meth)acrylate, pentachlorophenyl (meth)acrylate, pentabromophenyl (meth)acrylate, polyethylene glycol mono(meth)acrylate, and isobornyl (meth)acrylate.

Specific examples of a bifunctional monomer of another radical polymerizable compound of the component (B) may include triethylene glycol di(meth)acrylate, tetraethylene glycol di(meth)acrylate, polyethylene glycol (400) di(meth)acrylate, polyethylene glycol (600) di(meth)acrylate, polypropylene glycol (400) di(meth)acrylate, ethoxylated (4) bisphenol A di(meth)acrylate, ethoxylated (10) bisphenol A di(meth)acrylate, ethoxylated (30) bisphenol A di(meth)acrylate, ethoxylated (4) hydrogenated bisphenol A di(meth)acrylate, ethoxylated (30) hydrogenated bisphenol A di(meth)acrylate, EO-modified (10) hydrogenated bisphenol A di(meth)acrylate, ethylene glycol di(meth)acrylate, tricyclodecanediyldimethylene di(meth)acrylate, tripropylene glycol di(meth)acrylate, neopentyl glycol di(meth)acrylate, 1,4-butanediol di(meth)acrylate, 1,6-hexanediol di(meth)acrylate, a neopentyl glycol hydroxypivalate (meth)acrylic acid adduct, caprolactone-modified neopentyl glycol hydroxypivalate di(meth)acrylate, polyester di(meth)acrylates, polyester-based urethane bifunctional (meth)acrylates, aliphatic urethane acrylates, and an ester compound of a 6-hexanolide addition polymer (degree of polymerization 1 to 7) of 3-hydroxy-2,2-dimethylpropyl-3-hydroxy-2,2-dimethyl propionate and (meth)acrylic acid.

Specific examples of a polyfunctional monomer of another radical polymerizable compound of the component (B) may include ethoxylated (9) glycerin tri(meth)acrylate, ethoxylated (20) glycerin tri(meth)acrylate, polyether-based trifunctional (meth)acrylates, tris(acryloyloxyethyl) isocyanurate, trimethylolpropane tri(meth)acrylate, EO-modified trimethylolpropane tri(meth)acrylate, PO-modified trimethylolpropane tri(meth)acrylate, pentaerythritol tri(meth)acrylate, dipentaerythritol hexa(meth)acrylate, dipentaerythritol penta(meth)acrylate, ditrimethylolpropane tetra(meth)acrylate, dipentaerythritol monohydroxypenta(meth)acrylate, a (meth)acrylate of ε-caprolactone-modified dipentaerythritol, polyether-based urethane trifunctional (meth)acrylates, ethoxylated isocyanuric acid tri(meth)acrylate, and aliphatic urethane acrylates.

Another radical polymerizable compound of the component (B) may be synthesized by a known method, and in addition a commercial one may be used. Examples of the monofunctional monomer include ARONIX M-111 manufactured by TOAGOSEI CO., LTD. Examples of the bifunctional monomer include LIGHT ESTER 4EG manufactured by Kyoeisha Chemical Co., Ltd. and KAYARAD series HX-220 and HX-620 manufactured by Nippon Kayaku Co., Ltd. Examples of the polyfunctional monomer include ARONIX M-306 manufactured by TOAGOSEI CO., LTD.

The component (C) is a radical polymerization initiator, and is not particularly limited as long as it is a compound that can generate a radical species by irradiation with an active energy ray to initiate the radical reaction of the radical polymerizable compound. Specific examples of the radical polymerization initiator may include 2,2-dimethoxy-1,2- diphenylethan-1-one, 1-hydroxy-cyclohexyl=phenyl=ketone, 4-(4-methylphenylthio)benzophenone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-[4-[4-(2-hydroxy-2-methyl-propionyl)-benzyl]phenyl-2-methyl-propan-1-one, 2-hydroxy-1-[4-(2-hydroxyethoxy)phenyl]-2-methyl-1-propanone, phenylglyoxylic acid methyl ester, 2-methyl-1-(4-methylthiophenyl)-2-morpholinopropan-1-one, 2-benzyl-dimethylamino-1-(4-morpholinophenyl)butane-1,2-(dimethylamino)-2-[(4-methylphenyl)methyl]-1-[4-(morpholinyl)phenyl]-1-butane, 2,4,6-trimethylbenzoyl-diphenyl-phosphine oxide, bis(2,4,6-trimethylbenzoyl)-phenylphosphine oxide, 2,4,6-trimethylbenzoylphenylethoxyphosphine oxide, 2-isopropyithioxanthone, 2-ethyl-9,10-anthraquinone, bis(η5-2,4-cyclopentadien-1-yl)-bis(2,6-difluoro-3-(1H-pyrrol-1-yl)-phenyl)titanium, 1,2-octanedione-1-[4-(phenylthio)-2-(o-benzoyloxime)], ethanone,1-[9-ethyl-6-(2-methylbenzoyl)-9H-carbazol-3-yl]-1-(o-acetyloxime), camphorquinone, benzophenone, 2,4-diethylthioxanthon-9-one, 2-hydroxy-2-methyl-1-phenyl-1-propane, 4,4-bis(diethylamino)benzophenone, ethyl=4-(dimethylamino)-benzoate, [4-(methylphenylthio)phenyl]-phenylmethane, ethylhexyl-4-dimethylaminobenzoate, methyl=o-benzoylbenzoate, 4-methylbenzophenone, camphorquinone, tetrabutylammonium=butyltriph- enylborate, tetrabutylammonium butyltrinaphthylborate, 2-ethyl-4-methylimidazolium tetraphenylborate, and 1,5-diazabicyclo[4,3,0]nonene-5-tetraphenylborate. One radical polymerization initiator may be used alone, or two or more radical polymerization initiators may be used in combination.

The radical polymerization initiator, the component (C), may be synthesized by a known method, and in addition a commercial one may be used. Examples thereof include IRGACURE series, DAROCUR series, and LUCIRIN series manufactured by BASF, SB-PI series manufactured by Sort Co., Ltd., ESACURE series manufactured by IGM-RESINS, LUNACURE series manufactured by DKSH Japan, ADEKA OPTOMER series manufactured by ADEKA, organoboron compound series manufactured by Showa Denko K.K., and organoboron compound series manufactured by HOKKO CHEMICAL INDUSTRY CO., LTD.

The content of the radical polymerization initiator, the component (C), is in the range of 0.1 to 5.0% by mass, preferably in the range of 0.5 to 5.0% by mass, in the total amount of the composition for optical stereolithography. When the content is less than 0.1% by mass, the radical polymerization reaction of the composition for optical stereolithography is slow. When the content is more than 5.0% by mass, the curing characteristics of the composition for optical stereolithography decrease.

The component (D) is a sensitizer, and is not particularly limited as long as it is a compound that can increase the light sensitivity of the composition for optical stereolithography (preferably a compound that absorbs wavelengths of 300 to 500 nm). A polyfunctional thiol compound is preferred.

Specific examples of the polyfunctional thiol compound include 1,3,5-tris(3-mercaptobutyryloxyethyl)-1,3,5-triazine-2,4,6(1H,3H,5H)-trione, 1,4-bis(3-mercaptobutyryloxy)butane, pentaerythritol tetrakis(3-mercaptobutyrate), trimethylolpropane tris(3-mercaptopropionate), tris[(3-mercaptopropionyloxy)-ethyl]-isocyanurate, and pentaerythritol tetrakis(3-mercaptopropionate).

The polyfunctional thiol compound as the sensitizer, the component (D), may be synthesized by a known method, and in addition, a commercial one may be used. Examples thereof include QX40 manufactured by Mitsubishi Chemical Corporation, ADEKA HARDENER EH-317 manufactured by ADEKA CORPORATION, PEMP, TBMPIC, and TMPMP manufactured by SC Organic Chemical Co., Ltd., and KarenzMT series manufactured by Showa Denko K.K.

Specific examples of a sensitizer other than a poly functional thiol compound include benzophenone. Examples of an acridine-based sensitizer include 9-phenylacridine, 9-(P-methylphenyl)acridine, 9-(o-methylphenyl)acridine, 9-(o-chlorophenyl)acridine, and 9-(o-fluorophenyl)acridine, or examples of a coumarin-based sensitizer include 7,7-(diethylamino)(3,3-carbonylbiscounarin), 3-benzoyl-7-diethylaminocoumarin, and 7,7-bis(methoxy)(3,3-carbonylbiscoumarin). Examples of an anthracene-based sensitizer include 9,10-dimethoxyanthracene, 9,10-diethoxyanthracene, 9,10-dibutoxyanthracene, 9,10-bis(octanoyl)anthracene, 2,4-diethylthioxanthone, ethyl 4-(dimethylamino)benzoate, curcumin, diphenyl(2,4,6-trimethylbenzoyl)phosphine oxide, 2-ethylanthraquinone, and 2-isopropylthioxanthone.

The content of the sensitizer, the component (D), is in the range of 0.1 to 5.0% by mass, preferably in the range of 3.0 to 5.0% by mass, in the total amount of the composition for optical stereolithography. When the content is less than 0.1% by mass, the composition for optical stereolithography does not photocure, and the sensitivity decreases extremely. When the content is more than 5.0% by mass, the sensitivity decreases locally, and the composition for optical stereolithography cures only in the portion of the surface. By adding the component (D) to the composition for optical stereolithography, the reaction of photocuring can be further promoted to cure (bond) all polymerization components in the composition to obtain sufficient mechanical strength and heat resistance when a stereolithographic object is formed.

The optional component (E) is a compound having an allyl group that is not the above-described diallyl phthalate-based polymer, the component (A), among compounds having an allyl group. Specific examples of this compound having an allyl group that is not the diallyl phthalate-based polymer, the component (E), include diallyl 2,2'-biphenyldicarboxylate, diallyl 2,3-naphthalenedicarboxylate, pentaerythritol triallyl ether, diallyl terephthalate, diallyl isophthalate, diallyl orthophthalate, diallyl maleate, allyl acrylate, allyl methacrylate, allyl glycidyl ether, trimethylolpropane diallyl ether, and glycerin monoallyl ether.

For the compound having an allyl group that is not the diallyl phthalate-based polymer, the component (E), a commercial one may be used. Examples thereof include DAISO ISO DAP Monomer, DAISO ISO DAP 100 Monomer, and NEOALLYL series manufactured by OSAKA SODA CO LTD., and DAD and DAND manufactured by NISSHOKU TECHNO FINE CHEMICAL CO., LTD.

The content of the compound having an allyl group that is not the diallyl phthalate-based polymer, the component (E), is preferably in the range of 0.125 to 2.5% by mass, more preferably in the range of 0.15 to 2% by mass, in the total amount of the composition for optical stereolithography. By adding the component (E) to the composition for optical stereolithography, the reaction of photocuring can be further promoted to cure (bond) all polymerization components in the composition to obtain sufficient mechanical strength and flexibility when a stereolithographic object is formed.

The optional component (F) is a polyoxyethylene polyglyceryl ether-acrylic acid adduct having the structure of the following general formula (1):

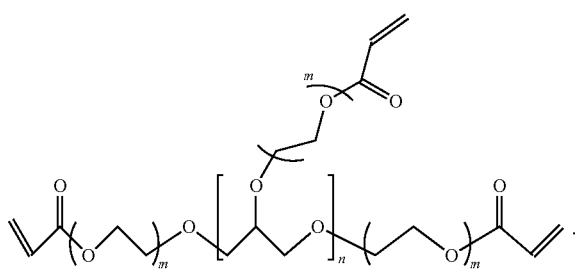

By adding this radical polymerizable compound, the component (F), to the composition for optical stereolithography, the rate of curing and the curing shrinkage properties are further improved.

The average degree of polymerization n of the polyglycerin of the polyoxyethylene polyglyceryl ether-acrylic acid adduct, the component (F), is in the range of 2 to 20, preferably in the range of 4 to 20. In the case of an average degree of polymerization of 1, that is, glycerin, the curing rate is slow. When the average degree of polymerization is greater than 20, the production of the radical polymerizable compound is difficult.

The degree of polymerization (addition mole number) m of the ethylene oxide of the polyoxyethylene polyglyceryl ether-acrylic acid adduct, the component (F), is in the range of 50 to 200 mol, preferably in the range of 60 to 150 mol, based on 1 mol of polyglycerin. When the addition mole number is less than 50 mol, the flexibility and hydrophilicity of the cured product disappear. When the addition mole number is greater than 200 mol, the production of the radical polymerizable compound is difficult.

For the reaction rate of the acrylic acid of the polyoxyethylene polyglyceryl ether-acrylic acid adduct, the component (F), three or more of the hydroxyl groups of the ethylene oxide adducts of one molecule of polyglycerin are preferably reacted.

The polyoxyethylene polyglyceryl-acrylic acid adduct, the component (F), may be synthesized by a known method, and in addition a commercial one may be used. Examples thereof include polyglycerin-based acrylate series SA-TE6, SA-TE60, and SA-ZE12 manufactured by Sakamoto Yakuhin Kogyo Co., Ltd.

The content of the polyoxyethylene polyglycerin-acrylic acid adduct, the component (F), is preferably in the range of 5 to 40% by mass, more preferably in the range of 10 to 30% by mass, in the total amount of the composition for optical stereolithography. When the content of the component (F) is less than 5% by mass, the effect of improving the rate of curing and the curing shrinkage properties is not sufficiently exhibited. When the content is more than 40% by mass, curing is too fast, and the close adhesion of thin cured film layers to each other worsens, and the strength of the stereolithographic object decreases, and the water resistance of the stereolithographic object also decreases.

The composition for optical stereolithography may contain, as other components, a solvent for dissolving or dispersing the component (C), a curing accelerator, a polymerization inhibitor, an ultraviolet absorbing agent, a fluorescent brightening agent, a colorant (a dye, an organic pigment, an inorganic pigment), a luminescent agent, luminous agent particles, organic polymer particles, cellulosic particles, metal particles, an electrically conductive filler, a photocationically polymerizable curing component, a biodegradable plastic, a biomass plastic, starch, and the like within a range that does not adversely affect the characteristics of the composition for optical stereolithography. The content of other components is not particularly limited and may be appropriately adjusted by those skilled in the art.

The stereolithographic object of the embodiment comprises a cured product of the above-described composition for optical stereolithography. The stereolithographic object can be applied to a wide range of fields. Specific examples of applications may include, but are not particularly limited to, precision parts, electrical and electronic parts, building structures, parts for automobiles, dies, matrices, medical fixtures such as plaster casts, mouthpieces for fixing teeth, dental plastic shaped objects, medical plastic appliances, and automobile parts.

The method for producing a stereolithographic object in the embodiment comprises at least the step of irradiating the above-described composition for optical stereolithography with an active energy ray to cure the composition for optical stereolithography, and can be performed using a conventional optical stereolithography method and optical stereolithography apparatus.

For example, when the method comprises (a) the step of selectively irradiating the surface of the composition for optical stereolithography with an active energy ray, based on contour line data made by slicing shape data input by three-dimensional CAD into a number of layers of thin cross sections, thereby forming a cured layer, (b) the step of further supplying the composition for optical stereolithography on the cured layer, (c) the step of performing the stacking operation of selective irradiation with an active energy ray as in the step (a) to newly form a cured layer continuous with the above-described cured layer, and (d) the step of repeating this stacking operation, a desired stereolithographic object can be provided. The thickness of a single layer or a stacked cured layer may be, for example, 20 to 200 μm. As the thickness of the cured layer is decreased, the shaping accuracy is increased, but the time and cost needed for production increase. Therefore, the thickness of the cured layer may be appropriately adjusted considering the balance between these.

Examples of the stereolithography apparatus used for the production of a stereolithographic object including a cured product of the composition for optical stereolithography may include, but are not particularly limited to, three-dimensional additive fabrication devices such as ATOMm-4000 (manufactured by CMET Inc.), DigitalWaX (registered trademark) 020X (manufactured by Sea Force Co., Ltd.), and ACCULAS (registered trademark) BA-85S (manufactured by D-MEC Ltd.).

The active energy ray with which the composition for optical stereolithography is irradiated is, for example, ultraviolet rays, visible light, radiation, X rays, an electron beam, or the like, preferably ultraviolet rays or visible light. The wavelength of ultraviolet rays or visible light is preferably 300 to 500 nm. Examples of the light source of ultraviolet rays or visible light include, but are not limited to, a semiconductor-pumped solid-state laser, a carbon arc lamp, a mercury lamp, a metal halide lamp, a xenon lamp, a chemical lamp, and a white LED. In particular, a laser is preferably used from the viewpoint of shaping accuracy, curability, and the like.

After the completion of the stacking operation, in order to remove the uncured composition for optical stereolithography adhering to the obtained stereolithographic object and the stereolithographic apparatus, the stereolithographic object and the stereolithographic apparatus are preferably washed. For the washing, water or a mixture obtained by mixing water with a surfactant, a disinfectant, an antiseptic, an alcohol, and/or the like may be used. After the washing, postcuring may be performed by irradiation with an active energy ray such as ultraviolet rays or visible light or heating as needed.

The stereolithographic object is a stereolithographic object comprising a cured product of the above-described composition for optical stereolithography, preferably a stereolithographic object obtained by stacking cured layers formed by curing the composition for optical stereolithography. The stereolithographic object is produced, for example, by the above-described method for producing a stereolithographic object. In the stereolithographic object, the cured layer films adhere closely to each other, and therefore the warp deformation decreases, and furthermore, the adhesion between the layers is good, and therefore, a stereolithographic object having high strength (for example, bending strength, bending modulus, and repeated bending strength) can be obtained.

prepared by the following procedure. All components were charged into a stirred container according to the weight ratio of a composition shown in Table 1, and stirred at 20 to 40° C. for 2 hours to obtain a liquid composition. This liquid composition was filtered through a 10 micron filter bag (PO-10-PO3A-503, manufactured by Xinxiang D. King Industry) to remove foreign materials, was allowed to stand overnight, and then degassed to obtain a transparent liquid composition. When several ml of each of the prepared compositions for optical stereolithography was taken and placed on a base, and isopropyl alcohol was poured, all were easily washed away.

TABLE 1A

| Name of component used | Component A | | Component B | | | Component C | Component D | Component E | Component F | |
|---|---|---|---|---|---|---|---|---|---|---|
| | DAISO DAP A | DAISO DAP K | B1 EBECRYL600 | B2 KAYARAD R-604 | Another ARONIX M-306 | IRGACURE 907 | Karenz MTNR1 | DAISO DAP 100 Monomer | SA-ZE 6 | SA-ZE 12 |
| Example 1 | 5 | | 25 | | 70 | 2 | 1 | | | |
| Example 2 | 5 | | 25 | | 70 | 2 | 1 | | 10 | |
| Example 3 | 5 | | | 25 | 70 | 2 | 1 | 0.2 | | |
| Example 4 | 5 | | | 25 | 70 | 2 | 1 | | 10 | |
| Example 5 | | 5 | 25 | | 70 | 2 | 1 | 0.2 | | |
| Example 6 | | 5 | 25 | | 70 | 2 | 1 | 0.2 | 10 | |
| Example 7 | | 5 | 25 | | 70 | 2 | 1 | 0.2 | | 10 |
| Example 8 | | 5 | | 25 | 70 | 2 | 1 | | | |
| Example 9 | | 5 | | 25 | 70 | 2 | 1 | | 10 | |
| Example 10 | | 5 | 25 | 25 | 50 | 2 | 1 | 0.2 | 10 | |
| Example 11 | 10 | | 35 | 15 | 25 | 2 | 1 | 0.2 | 30 | |
| Example 12 | | 10 | 10 | 40 | 35 | 2 | 1 | 0.2 | | 20 |
| Comparative Example 1 | 5 | | 3 | | 70 | 2 | 1 | | | |
| Comparative Example 2 | 5 | | 60 | | 70 | 2 | 1 | | | |
| Comparative Example 3 | 5 | | | 3 | 70 | 2 | 1 | | | |
| Comparative Example 4 | 5 | | | 60 | 70 | 2 | 1 | | | |
| Comparative Example 5 | | | 35 | 15 | 35 | 2 | 1 | | | |
| Comparative Example 6 | | 0.5 | 25 | 25 | 50 | 2 | 1 | | | |

EXAMPLES

The present invention will be specifically described below by giving Examples and Comparative Examples, but the present invention is not limited to the following Examples.

Examples 1 to 12 and Comparative Examples 1 to 4

Preparation of Compositions for Optical Stereolithography

The compositions for optical stereolithography of Examples 1 to 12 and Comparative Examples 1 to 4 were

TABLE 1B

| | Total of weight ratio |
|---|---|
| Example 1 | 103 |
| Example 2 | 113 |
| Example 3 | 103.2 |
| Example 4 | 113 |
| Example 5 | 113.2 |
| Example 6 | 113.2 |
| Example 7 | 113.2 |
| Example 8 | 103 |
| Example 9 | 113 |
| Example 10 | 118.2 |
| Example 11 | 118.2 |
| Example 12 | 118.2 |
| Comparative Example 1 | 81 |
| Comparative Example 2 | 138 |
| Comparative Example 3 | 81 |
| Comparative Example 4 | 138 |
| Comparative Example 5 | 88 |
| Comparative Example 6 | 103.5 |

The details of the components in the table are shown below.

DAISO DAP A: diallyl phthalate-based polymer, component (A), iodine value (g/100 g) 50 to 60, viscosity 70 to 110 mPa·s/30° C. (50% MEK viscosity), manufactured by OSAKA SODA CO., LTD.

DAISO DAP K: diallyl phthalate-based polymer, component (A), iodine value (g/100 g) 50 to 60, viscosity 30 to 50 mPa·s/30° C. (50% MEK viscosity), manufactured by OSAKA SODA CO., LTD.

EBECRYL 600: bisphenol A-based epoxy diacrylate, component (B1), viscosity 3000 (60° C.) mPa·s, average molecular weight 500, acid value <1, OH value 220 mg KOH/g, manufactured by DAICEL-ALLNEX LTD.

KAYARAD R-604: dioxane glycol diacrylate, component (B2), viscosity 200 to 400 mPa·s (25° C.), acid value <1.0, manufactured by Nippon Kayaku Co., Ltd.

ARONIX M-306: mixture of pentaerythritol tri- and tetraacrylate (tri-form 65 to 70%), another radical polymerizable compound of component (B), viscosity 400 to 650 mPa·s/25° C., manufactured by TOAGOSEI CO., LTD.

IRGACURE 907: 2-methyl-1-(4-methylthiophenyl)-2-morpholinopropan-1-one, component (C), manufactured by BASF KarenzMTNR1: 1,3,5-tris(3-mercaptobutyryloxyethyl)-1,3,5-triazine-2,4,6-(1H,3H,5H)-trione, component (D), manufactured by Showa Denko K.K.

DAISO DAP 100 Monomer: diallyl isophthalate, component (E), manufactured by OSAKA SODA CO LTD.

SA-ZE6: polyoxyethylene polyalycerin ether-(6) acrylic acid adduct, component (F), curing shrinkage rate 8.7%, pencil hardness H, viscosity 600/25° C. mPa·s, solubility; water ×, methanol ○, acetone ⊙ (◉: transparent and dissolved, ○: dull, △: partially dispersed and precipitated, ×: insoluble), manufactured by Sakamoto Yakuhin Kogyo Co., Ltd.

SA-ZE12: polyoxyethylene polyglycerin ether-(12) acrylic acid adduct, component (F), curing shrinkage rate 7.4%, pencil hardness F, viscosity 1700/25° C. mPa·s, solubility; water △, methanol ⊙, acetone ⊙ (◉: transparent and dissolved, ○: dull, △: partially dispersed and precipitated, ×: insoluble), manufactured by Sakamoto Yakuhin Kogyo Co., Ltd.

Fabrication of Evaluation Samples A

In order to evaluate the curing time of the compositions for optical stereolithography, samples were fabricated by the following procedure. The composition for optical stereolithography of Example 1 was poured into a handmade polyethylene rectangular mold (about 10 mm wide×100 mm long×, 5 mm deep) so as to form a 1 mm liquid film, and irradiated by 3-kw high pressure mercury lamp (wavelength 365 nm, distance 1 m) for 5 seconds, 10 seconds, 15 seconds, 20 seconds, 25 seconds, and 30 seconds to obtain evaluation samples A. Also, for the compositions for optical stereolithography of Examples 2 to 12 and Comparative Examples 1 to 4, evaluation samples A were obtained in the same manner.

Fabrication of Evaluation Samples B

In order to evaluate the curing time of the compositions for optical stereolithography, samples were fabricated by the following procedure. The composition for optical stereolithography of Example 1 was poured into a handmade polyethylene rectangular mold (about 10 mm wide×100 mm long×, 5 mm deep) so as to form a 1 mm liquid film, and irradiated by a 3-kw high pressure mercury lamp (wavelength 365 nm, distance 1 m) for 20 seconds. This was repeated a total of four times to make a flat plate about 4 mm thick (about 10 mm wide×100 mm long). Furthermore, the flat plate was re-irradiated for 30 minutes to obtain the evaluation sample B that was an optically stereolithographic object. Also, for the compositions for optical stereolithography of Examples 2 to 12 and Comparative Examples 1 to 4, evaluation samples B were obtained in the same manner.

Evaluation Methods

1. Evaluation of Curing Time of Composition for Optical Stereolithography

The evaluation samples A were used, and from the sample with short irradiation time, the surface state was observed. The irradiation time according to the evaluation sample A without the tack of the surface was taken as the curing time. For "the presence or absence of the tack of the surface", the evaluation sample A was placed in an oven, treated at 35° C. for 30 minutes, and cooled to room temperature (25° C.), and then a polyester film was pressed against the surface of the evaluation sample A by hand. When the polyester film did not peel easily, it was determined that the surface had tack. When the polyester film peeled, it was determined that the surface had no tack. The curing time of the evaluation sample A is shown in Table 2.

2. Observation of Layers (Side Surface) of Optically Stereolithographic Object

The evaluation sample B was used, and the layers (side surface) of the flat plate were observed by a JEOL model JSM-5600 scanning electron microscope (acceleration voltage 7 kv, magnification 200×). For the criteria of evaluation, a case in which there was a gap between the layers was considered as ("×"), and a case in which there was no gap between the layers was considered as ("○"). The results are shown in Table 2.

3. Observation of Warp Deformation of Optically Stereolithographic Object

The flat plate of the evaluation sample B was placed on a flat base, and the distance at which its end floated from the flat base was measured. For the criteria of determination, a case in which the floating distance was 2 mm or more was considered as ("×"), a case in which the end floated at a floating distance of 2 mm or less was considered as ("△"), and a case in which the floating distance was 0 mm, that is, the end did not float, was considered as ("○"). The results are shown in Table 2.

4. Tensile Test

For the flat plate of the evaluation sample B, tensile strength and elongation were measured in accordance with ISO527-1 under the following measurement conditions. The elongation was measured as the maximum elongation rate at breakage. The results are shown in Table 2.

Measuring apparatus: model 3366 universal testing machine manufactured by Instron
  Tensile speed (crosshead speed): 5 mm/min
  Measurement environment: temperature 25° C., humidity 45% RH
  Gauge length: 80 mm 5. Three-Point Bending Test The three-point bending test of the flat plate of the evaluation sample B was performed in accordance with ISO527-1 under the following measurement conditions to measure bending strength and bending modulus. The results are shown in Table 2.

Measuring apparatus: model 3366 universal testing machine manufactured by Instron
  Test conditions: three-point bending test jig indenter radius 5 mm
    span 64 mm
    load speed (crosshead speed) 2 mm/min
  Measurement environment: temperature 25° C., humidity 45% RH 6. Bare Drop Test For the evaluation sample B, a bare drop test was performed under the following measurement conditions, and the presence or absence of a fracture was visually observed, and drop fracture observation was performed. The results are shown in Table 2.

Drop floor surface: marble floor tile

Drop height: 3 m

Weight of sample: 14.5 g

Drop angle of sample: 60 degrees to marble floor tile surface

For the criteria of determination, five samples were dropped, and the number of samples with a fracture including a crack was recorded.

7. Repeated Folding Test

Ten millimeters of an end of the evaluation sample B was held and fixed by a vise. The other end of the evaluation sample B was held by pliers, and the evaluation sample B was folded to the left and to the right ten times. After the test, the appearance of the folded part is visually observed. The criteria of determination were ○: no change, Δ: color change to white, ▲: a crack, and ×: fractured.

The evaluation, observation, and test results of the above-described 1 to 7 are shown in Table 2. It was found that for the compositions for optical stereolithography of Examples 1 to 12, the curing time was 4 to 10 seconds, and therefore, the curing time was shorter, the sensitivity was higher, and the curing rate was faster than those of the Comparative Examples. This indicates that the curing density is high. For the stereolithographic objects obtained by stacking cured layers of the compositions for optical stereolithography of Examples 1 to 12, the cured films adhered closely to each other, and therefore, no warp deformation was observed, the tensile strength, the elongation, the bending strength and the bending modulus, and the repeated bending strength were excellent, and drop fracture was hardly observed.

The invention claimed is:

1. A composition for optical stereolithography, comprising:
   (A) a diallyl phthalate-based polymer;
   (B) radical polymerizable compounds having a methacrylic group and/or an acrylic group;
   (C) a radical polymerization initiator; and
   (D) a sensitizer,
   wherein the (B) radical polymerizable compounds having a methacrylic group and/or an acrylic group comprises at least
   (B1) a radical polymerizable compound of an epoxy (meth)acrylate having a methacrylic group and/or an acrylic group, and/or
   (B2) a radical polymerizable compound of a dioxane (meth)acrylate having a methacrylic group and/or an acrylic group,
   wherein the composition for optical stereolithography contains:
   0.5 to 10% by mass of the (A) diallyl phthalate-based polymer;
   5 to 43% by mass of a total content of the (B1) and (B2) radical polymerizable compounds,
   20 to 95% by mass of a radical polymerizable compound in the (B) radical polymerizable compounds other than the (B1) and (B2) radical polymerizable compounds,
   0.1 to 5% by mass of the (C) radical polymerization initiator, and
   0.1 to 5% by mass of the (D) sensitizer.

2. The composition for optical stereolithography according to claim 1, further comprising 0.125 to 2.5% by mass of (E) a compound having an allyl group that is not a diallyl phthalate-based polymer.

3. The composition for optical stereolithography according to claim 1, wherein the (A) diallyl phthalate-based polymer is a diallyl orthophthalate polymer or a diallyl isophthalate polymer.

TABLE 2

| | Evaluation sample A | Evaluation sample B | | | | | | |
|---|---|---|---|---|---|---|---|---|
| | Curing time (seconds) | Layers (side surface) | Warp deformation | Tensile strength (MPa) | Tensile elongation (%) | Bending strength (MPa) | Bending modulus (MPa) | Drop fracture observation (number) | Repeated folding test |
| Example 1 | 5 | ○ | ○ | 70 | 25 | 88 | 1980 | 1 | ○ |
| Example 2 | 4 | ○ | ○ | 78 | 30 | 87 | 1890 | 0 | ○ |
| Example 3 | 5 | ○ | ○ | 68 | 27 | 93 | 1921 | 0 | ○ |
| Example 4 | 4 | ○ | ○ | 70 | 29 | 90 | 1930 | 1 | ○ |
| Example 5 | 5 | ○ | ○ | 69 | 33 | 95 | 2016 | 0 | ○ |
| Example 6 | 4 | ○ | ○ | 67 | 30 | 88 | 2039 | 0 | ○ |
| Example 7 | 8 | ○ | ○ | 66 | 31 | 89 | 1980 | 1 | ○ |
| Example 8 | 10 | ○ | ○ | 65 | 36 | 88 | 2021 | 0 | ○ |
| Example 9 | 8 | ○ | ○ | 69 | 33 | 85 | 2018 | 0 | ○ |
| Example 10 | 7 | ○ | ○ | 60 | 31 | 79 | 1971 | 1 | ○ |
| Example 11 | 8 | ○ | ○ | 61 | 28 | 78 | 1720 | 0 | ○ |
| Example 12 | 8 | ○ | ○ | 60 | 29 | 78 | 1730 | 1 | ○ |
| Comparative Example 1 | 25 | ○ | ○ | 35 | 8 | 70 | 1680 | 5 | Δ |
| Comparative Example 2 | 25 | ○ | ○ | 30 | 7 | 61 | 1650 | 5 | × |
| Comparative Example 3 | 25 | ○ | ○ | 32 | 6 | 63 | 1693 | 4 | × |
| Comparative Example 4 | 25 | ○ | ○ | 33 | 9 | 61 | 1301 | 5 | × |
| Comparative Example 5 | 27 | ○ | ○ | 31 | 3 | 50 | 1211 | 5 | × |
| Comparative Example 6 | 29 | ○ | ○ | 33 | 3 | 49 | 1191 | 5 | × |

4. The composition for optical stereolithography according to claim 1, further comprising 5 to 40% by mass of (F) a polyoxyethylene polyglyceryl ether-acrylic acid adduct having a structure of the following general formula (1):

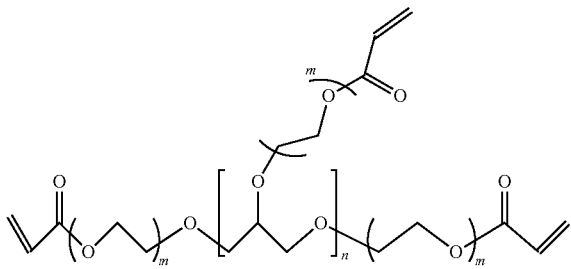

wherein n represents an integer of 2 to 20, and m represents an integer of 50 to 200.

5. A method for producing an optically stereolithographic object, comprising a step of irradiating the composition for optical stereolithography according to claim 1 with an active energy ray to cure the composition for optical stereolithography.

6. An optically stereolithographic object comprising a cured product of the composition for optical stereolithography according to claim 1.

7. The composition for optical stereolithography according to claim 2, wherein the (A) diallyl phthalate-based polymer is a diallyl orthophthalate polymer or a diallyl isophthalate polymer.

8. The composition for optical stereolithography according to claim 2, further comprising 5 to 40% by mass of (F) a polyoxyethylene polyglyceryl ether-acrylic acid adduct having a structure of the following general formula (1):

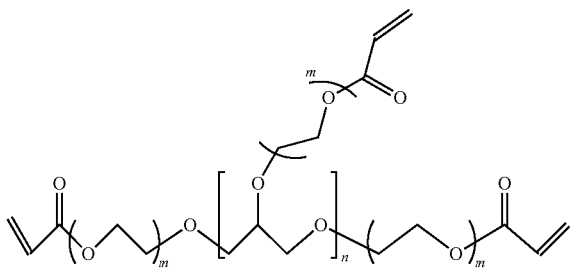

wherein n represents an integer of 2 to 20, and m represents an integer of 50 to 200.

9. The composition for optical stereolithography according to claim 3, further comprising 5 to 40% by mass of (F) a polyoxyethylene polyglyceryl ether-acrylic acid adduct having a structure of the following general formula (1):

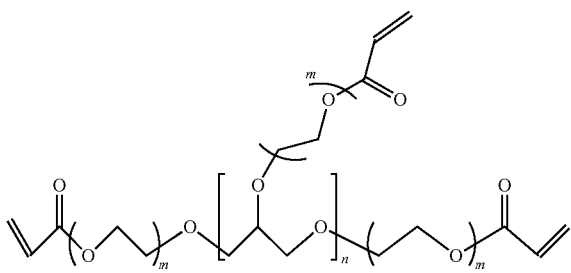

wherein n represents an integer of 2 to 20, and m represents an integer of 50 to 200.

10. The composition for optical stereolithography according to claim 7, further comprising 5 to 40% by mass of (F) a polyoxyethylene polyglyceryl ether-acrylic acid adduct having a structure of the following general formula (1):

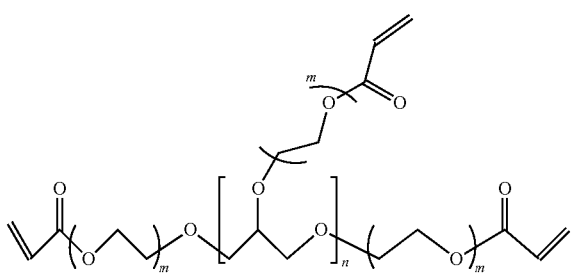

wherein n represents an integer of 2 to 20, and m represents an integer of 50 to 200.

11. A method for producing an optically stereolithographic object, comprising a step of irradiating the composition for optical stereolithography according to claim 2 with an active energy ray to cure the composition for optical stereolithography.

12. A method for producing an optically stereolithographic object, comprising a step of irradiating the composition for optical stereolithography according to claim 3 with an active energy ray to cure the composition for optical stereolithography.

13. A method for producing an optically stereolithographic object, comprising a step of irradiating the composition for optical stereolithography according to claim 4 with an active energy ray to cure the composition for optical stereolithography.

14. A method for producing an optically stereolithographic object, comprising a step of irradiating the composition for optical stereolithography according to claim 7 with an active energy ray to cure the composition for optical stereolithography.

15. A method for producing an optically stereolithographic object, comprising a step of irradiating the composition for optical stereolithography according to claim 8 with an active energy ray to cure the composition for optical stereolithography.

16. A method for producing an optically stereolithographic object, comprising a step of irradiating the composition for optical stereolithography according to claim 9 with an active energy ray to cure the composition for optical stereolithography.

17. A method for producing an optically stereolithographic object, comprising a step of irradiating the composition for optical stereolithography according to claim 10 with an active energy ray to cure the composition for optical stereolithography.

18. An optically stereolithographic object comprising a cured product of the composition for optical stereolithography according to claim 2.

19. An optically stereolithographic object comprising a cured product of the composition for optical stereolithography according to claim 3.

20. An optically stereolithographic object comprising a cured product of the composition for optical stereolithography according to claim 4.

21. The composition for optical stereolithography according to claim 2, wherein the (E) compound having an allyl group is diallyl 2,2'-biphenyldicarboxylate, diallyl 2,3-naphthalenedicarboxylate, pentaerythritol triallyl ether, diallyl terephthalate, diallyl isophthalate, diallyl orthophthalate, diallyl maleate, allyl acrylate, allyl methacrylate, allyl glycidyl ether, trimethylolpropane diallyl ether, or glycerin monoallyl ether.

* * * * *

UNITED STATES PATENT AND TRADEMARK OFFICE
CERTIFICATE OF CORRECTION

PATENT NO. : 11,939,416 B2
APPLICATION NO. : 16/963018
DATED : March 26, 2024
INVENTOR(S) : Okamoto et al.

Page 1 of 1

It is certified that error appears in the above-identified patent and that said Letters Patent is hereby corrected as shown below:

In the Specification

Column 4, Line 64: Please correct "EPDXY" to read --EPOXY--

Column 8, Line 12: Please correct "(3,3-carbonylbiscounarin)," to read --(3,3-carbonylbiscoumarin),--

Column 13, Line 30: Please correct "polyalycerin" to read --polyglycerin--

Signed and Sealed this
Twenty-third Day of July, 2024

Katherine Kelly Vidal
*Director of the United States Patent and Trademark Office*